United States Patent

Rhoades

Patent Number: 5,363,879
Date of Patent: Nov. 15, 1994

[54] CRYOGENIC COUPLING

[75] Inventor: George D. Rhoades, LaGrange, Ill.

[73] Assignee: Liquid Carbonic Corporation, Oak Brook, Ill.

[21] Appl. No.: 196,318

[22] Filed: Feb. 15, 1994

[51] Int. Cl.⁵ ............................................. F16L 37/28
[52] U.S. Cl. ............................... 137/614.05; 137/377; 285/904; 62/50.7
[58] Field of Search .............. 137/614.05, 614.03, 137/614.04, 614.02, 614.06, 377; 251/149.9; 285/904; 62/299, 50.7

[56] References Cited

U.S. PATENT DOCUMENTS

| | | | |
|---|---|---|---|
| 3,550,624 | 12/1970 | Johnson | 137/614.05 X |
| 3,842,614 | 10/1974 | Karcher et al. | 137/614.04 X |
| 4,676,269 | 6/1987 | Sarson | 137/614.06 |
| 4,745,948 | 5/1988 | Wilcox et al. | 137/614.05 |
| 5,255,699 | 10/1993 | Herzan et al. | 137/614.05 X |

*Primary Examiner*—Martin P. Schwadron
*Assistant Examiner*—Kevin L. Lee
*Attorney, Agent, or Firm*—Fitch, Even, Tabin & Flannery

[57] ABSTRACT

The present invention is directed to a coupling assembly for dispensing cryogenic fluids, The coupling assembly includes an upstream terminus coupled to a source of cryogenic fluid and a downstream terminus connected to a container for receiving the cryogenic fluid. A poppet valve assembly is disposed at the upstream dispensing terminus. This poppet valve assembly is mechanically operated to be opened and closed. A second poppet valve assembly has a downstream terminus which is coupled to a receiving tank for the cryogenic fluid and an upstream terminus for coupling with the first poppet valve assembly. The second poppet valve assembly is opened and closed through overcoming the pressure of a spring by the pressure of the cryogenic fluid being transferred and the release of the cryogenic fluid pressure, A threaded wheel mounted on the first poppet valve assembly mates with a threaded portion on the second poppet valve assembly to connect and disconnect the two parts of the coupling.

11 Claims, 5 Drawing Sheets

CRYOGENIC COUPLING

FIELD OF THE INVENTION

The present invention relates to a leak tight coupling for transferring cryogenic fluids, which is freeze-proof and which has minimum leakage when the coupling is detached. In particular, the present invention is directed to a coupling for cryogenic fluids that is easily and quickly connected and which is easy to disconnect even after being cold from repeated cryogenic fluid transfers.

BACKGROUND OF THE INVENTION

Field experience has shown that water ice is a serious problem for couplings in repetitive transfers of cryogenic fluids. As the coupling warms on its storage rack after the transfer of a cryogenic fluid, it collects frost. The frost forms at any place that ambient air can reach. When the coupling reaches 32° F., the frost melts and leaves water on all surfaces inside and outside of the coupling where the frost had formed. When the next transfer of the cryogenic fluid occurs before the coupling has had time to dry, the coupling is attached wet. The transfer of the cryogenic fluid then freezes the water to ice. The coupling is then difficult and sometimes impossible to uncouple and remove.

It is also important in the transfer of certain cryogenic fluids, such as liquid natural gas (LNG) to minimize the amount of cryogenic fluid that is most when the coupling is disconnected. A further important consideration for cryogenic couplings is that they couple and uncouple easily and do not leak cryogenic fluid while in service and under pressure. A further important consideration for cryogenic fluid couplings is that they must be a "quick" connection. The use of a wrench for making and breaking the coupling would not be acceptable.

Accordingly, it is a principal object of the present invention to provide a coupling for the transfer of cryogenic fluids that is quickly and easily connected, that is quickly and easily disconnected and that water ice cannot buildup to interfere with the operation of the coupling. It is also an objective of the present invention that any loss of cryogen during the coupling and uncoupling be kept to an absolute minimum. It is also an object of the present invention to provide safety locking mechanisms to prevent the flow of cryogen while the coupling is not connected to the receiving tank as well as to prevent the flow of cryogen while the coupling is being removed from the receiving tank. It is also an object of the present invention to provide protection for the operating person from cold and accidental spray of cryogenic fluid being transferred. It is also an object of the present invention to provide drop protection for the coupling and to provide warm means for the operating person to handle the coupling. It is also an object of the present invention to provide handle means for the operating persons used in handling the coupling while it is cryogenically cold. It is also an object of the present invention to provide insulation that is flexible at cryogenic temperatures to protect the operating person from the cryogenic cold. When the above objects are taken in total, it is an object of the present invention to provide a means for transfer of cryogenic fluids in such a way that the cryogenic nature of the fluid being transferred is essentially "invisible" to the operating person.

SUMMARY OF THE INVENTION

The present invention is directed to a coupling assembly for dispensing cryogenic fluids. The coupling assembly includes an upstream terminus coupled to a source of cryogenic fluid and a downstream terminus connected to a container for receiving the cryogenic fluid. A poppet valve assembly is disposed at the upstream dispensing terminus. This poppet valve assembly is mechanically operated to be opened and closed. A second poppet valve assembly has a downstream terminus which is coupled to a receiving tank for the cryogenic fluid and an upstream terminus for coupling with the first poppet valve assembly. The second poppet valve assembly is opened and closed through overcoming the pressure of a spring by the pressure of the cryogenic fluid being transferred and the release of the cryogenic fluid pressure. A threaded wheel mounted on the first poppet valve assembly mates with a threaded portion on the second poppet valve assembly to connect and disconnect the two parts of the coupling.

DETAILED DESCRIPTION OF THE INVENTION

Figure 1:
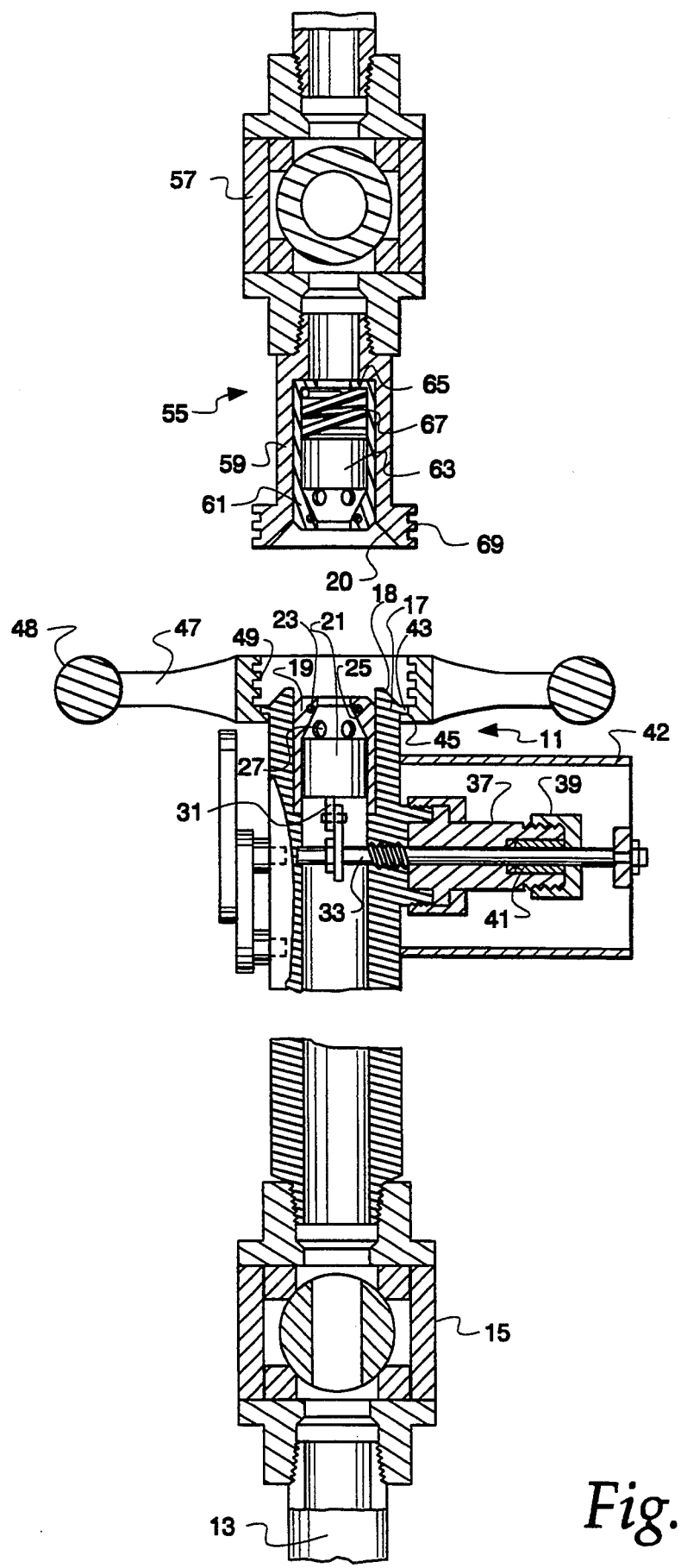
FIG. 1 is a partial cross-sectional view of the disengaged coupling of the invention with all valves in a closed position showing a downstream section connected to a tank to which the cryogenic fluid will be transferred.

As shown in FIG. 1, a first poppet valve assembly 11 is connected to a conduit 13, such as a hose, which is connected to a source of cryogenic fluid. While the poppet valve assembly 11 is sufficient to initiate and terminate the flow of cryogenic fluid from the cryogenic source, a ball valve 15 is preferably located in the cryogenic fluid path for reasons of safety and redundancy. The ball valve 15 is preferably of the type having a venting hole when closed so that any retained cryogenic fluid can be returned to the cryogenic source when the ball valve and poppet valve are closed. The poppet valve assembly 11 includes a housing 17 which is coupled to a downstream second poppet valve described hereinbelow. The housing 17 includes a coupling seat 18 for mating with a coupling seat 20 on the housing 59 of the second poppet valve assembly described hereinbelow. The housing 17 has a valve seat means 19 affixed to the inside diameter of the housing at the upstream end thereof. As used herein, the terms "upstream" and "downstream" are used in relationship to the flow of cryogenic fluid, which in FIG. 1 is from the bottom of FIG. 1 to the top of the FIGURE. A first poppet valve 21 is slidably disposed within the valve seat means 19. The poppet valve 21 has a circumferential surface 23 at its edge, which mates with a similar but inverted surface flange 25 on housing 17 when the poppet valve is in the closed position. The poppet valve provides a flow path 27 which permit escape of the cryogenic fluid when the poppet valve is withdrawn downstream.

Figure 2:
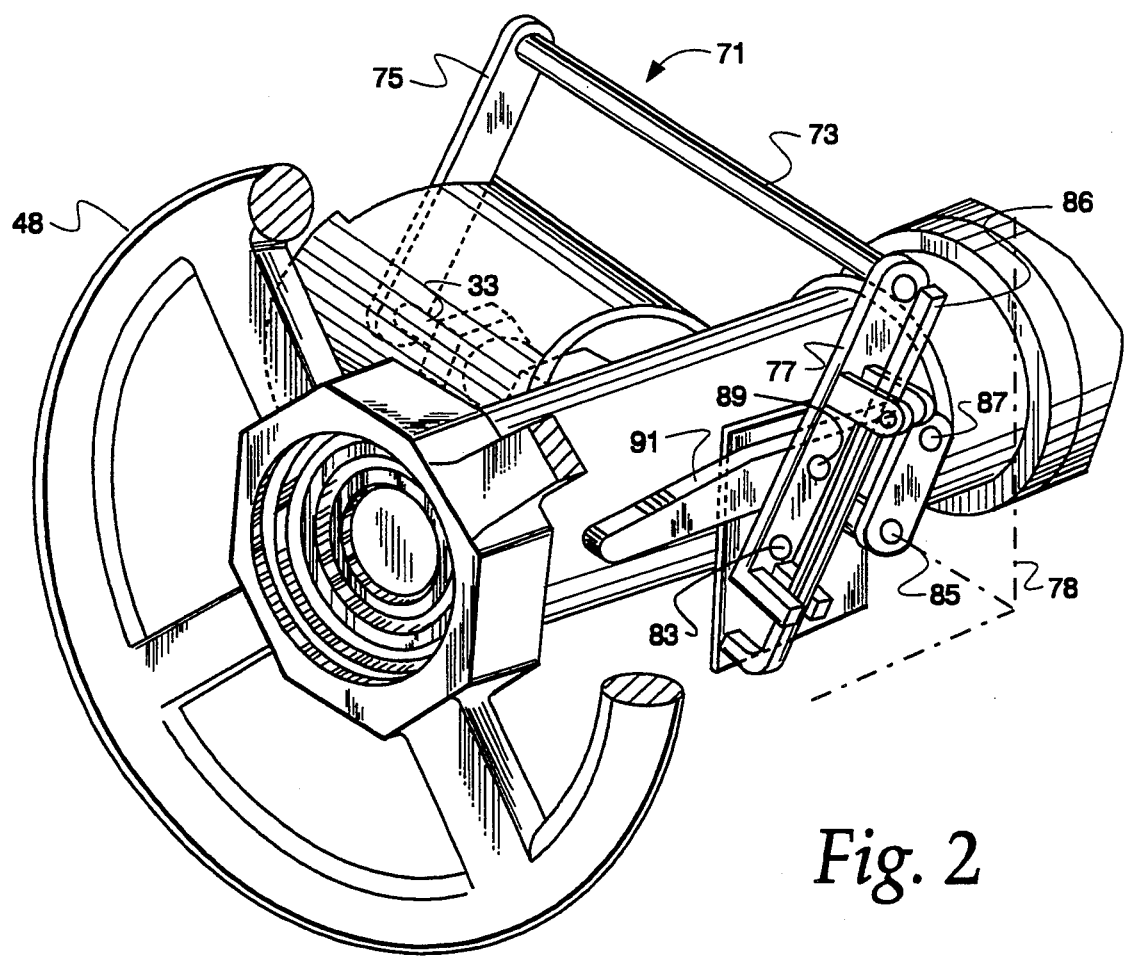
FIG. 2 is a perspective view of the actuator handle and safety locks for operating the valve assembly of the cryogenic coupling of the invention.

Mechanical actuator means are used to slide the poppet valve within valve seat means 19. The mechanical actuator means includes mechanical linkage 31 to a shaft 33. The shaft 33 is rotated between an off position and an on position by means of a bar 73, as best seen in FIG. 2. The mechanical actuator means also includes a housing 37, a packing nut 39 and packing 41. The mechanical actuator means are surrounded by a protective shroud 42 to prevent damage during use.

The housing 17 has an outwardly extending circumferential flange 43. The outwardly extending flange 43 mates with a circumferential flange 45 of the lateral internally threaded closure section 49 extending downstream past the housing 17. Closure section 49 is attached to a closure means 47 in the shape of a wheel which has insulating properties to prevent the cold of the cryogenic fluid from reaching the extremity 48 of the closure means 47.

A second poppet valve assembly 55 is connected to a tank (not shown) which is to be filled with cryogenic fluid. As shown in FIG. 1, a ball valve 57 is interposed between the second poppet valve assembly 55 and the tank for safety and redundancy purposes. The poppet valve assembly 55 has a housing 59, a coupling seat 20 for mating with coupling seat 18 of the first poppet valve assembly 11, a valve seat 61 and a poppet valve 63 similar to the first poppet valve assembly. The housing 59 has a spring restraining means in the form of a restraining flange 65. A spring 67 is interposed between the restraining flange 65 and poppet valve 63. The spring 67 is under slight compression.

The housing 59 has an external threaded section 69 which mates with the internal threaded closure section 49 of the first poppet valve assembly when closure section 49 is turned. The threads of the threaded section 69 and 49 are preferably of a type intended primarily for power-transmission screws, such as American Standard Acme Threads. Such threads are square cut and are used in situations where a substantial amount of force must be developed, such as in a vice. Such threads are coarse and easily engaged when closure means 47 is turned, the mating surfaces of the two poppet valve housings 17 and 59 are drawn into liquid tight closed relationship.

In operation, ball valves 15 and 57 are opened after the two poppet valve assemblies have been closed into liquid tight relationship. The first poppet valve 21 is opened by means of handle 73. The pressure of the liquid cryogenic stream which passes through the first poppet valve is sufficient to override the pressure of the spring 67 and permit passage of the liquid cryogen through the second poppet valve assembly and into the tank being filled. At the end of filling, the first poppet valve 21 is closed. Pressure is then removed from the second poppet valve 63 and the spring 67 forces the second poppet valve 63 into a closed position. Ball valves 15 and 57 can then be closed. As can be seen from FIG. 4, the first poppet valve 21 and second poppet valve 63 are in close proximity in the coupled and open position. Accordingly, very little liquid cryogen is lost when the poppets are closed and housing 17 and 55 are separated.

Figure 3:
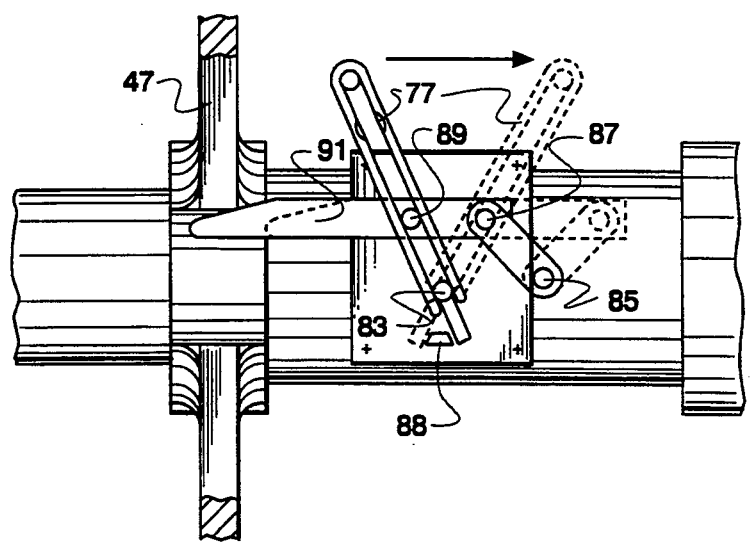
FIG. 3 is a cross-sectional view of the actuator handle showing the handle in open engaged position (solid line) and a closed disengaged position (dotted line)

As shown in FIGS. 2 and 3, a manually actuated valve handle assembly 71 is shown which can be used in connection with the cryogenic coupling assembly of the invention. The actuating valve handle assembly 71 includes a handle 73 which is fitted to two depending legs 75 and 77. Leg 75 is affixed to shaft 33 of the mechanical actuator means. Depending leg 77 is attached to housing 17 by pins 83 and 85 set into blind holes. A prop 91 is affixed to depending leg 77 by pins 87 and 89 also set into blind holes. In FIG. 3, the actuating valve handle assembly 71 is shown in the closed posing on in dotted lines. A safety latch mechanism can be provided to keep the valve in the full closed position to prevent the valve from opening when the coupling is not attached to the receiving tank. The safety latch consists of a slidable bar 86 and a detent 88. When the coupling is attached to the receiving tank, the operating person must deliberately retract the bar 86 to move handle 73 in order to start the cryogenic liquid flow.

When the bar 73 is moved forward into the open position, the prop 91 moves between the stops on closure means 47. This prevents an operator from opening the coupling when the first poppet valve 21 is in the open position.

Figure 5:
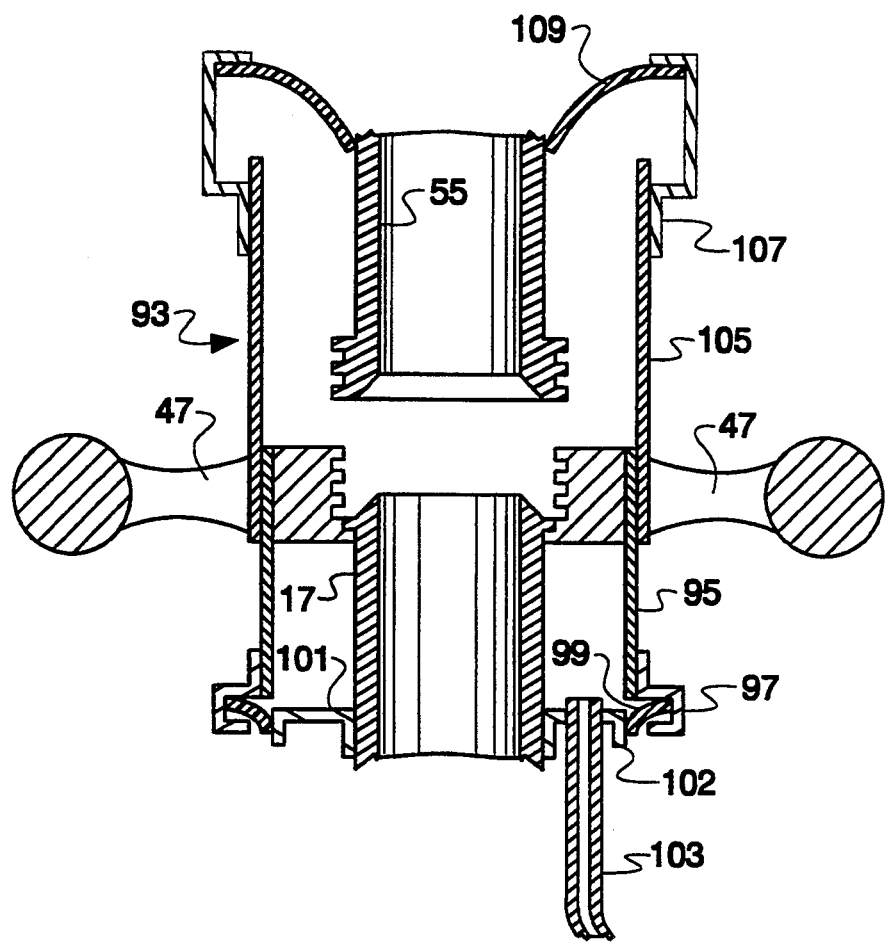
FIG. 5 is a cross-sectional skeleton view of a further embodiment of the coupling of the invention.

When the coupling of the invention is used to transfer a cryogenic fluid, the problem of icing is overcome as shown in FIG. 5. For ease of description the internal components of the coupling are not shown in FIG. 5. As shown in FIG. 5, a vapor containment chamber 93 is established adjacent to the two parts of the coupling when they are engaged. The vapor containment chamber 93 includes a cylindrical wall 95 which is mounted on the closure wheel 47. At the upstream end of the cylindrical wall 95, a seal holder 97 is mounted. A stationary cylindrical seal bracket 101 is affixed to housing 17. The hose bracket 101 has a downwardly pending lip 102. A flexible seal 99 is mounted into the downstream seal holder 97. A purge vapor conduit 103 may be mounted in seal bracket 101 through a suitable aperture. A downstream cylindrical wall 105 is also mounted onto closure wheel 47. The downstream cylindrical wall 105 has a downstream cylindrical seal holder 107 and a downstream flexible seal 109.

A purge gas may be introduced into the containment chamber through purge vapor hose 103. The flexible seals 99 and 109 are foraminous and permit purge vapor gas to escape from the vapor containment chamber 93. Seal 109 is designed to close against the second poppet valve assembly 55 when it is near or connected to the first poppet valve assembly 17 and to close against itself when it is not near or connected to the first poppet valve assembly. It has been determined that the use of nylon or other natural or synthetic fiber brushes are particularly useful as purge seals. The purge gas is introduced into the purge vapor containment chamber at a low rate of from about 2 to about 10 cubic feet per hour. The purge gas is a dry gas having a dew point of less than about −90° F. A preferred purge gas is nitrogen. Any suitable purge gas can be used so long as the purge gas is dry to sweep moist ambient air away from the closure during transfer of the cryogenic fluid and until the coupling warms to ambient temperature. The vapor containment chamber 93 has been omitted from FIGS. 1–4 and 6 for clarity.

The vapor containment chamber 93 also has a safety function as well as an ice prevention function. The vapor containment chamber also serves as a cryogenic liquid spray containment chamber to protect the operating person from coming in contact with cryogenic fluid spray in the event of a major coupling leak.

Figure 6:
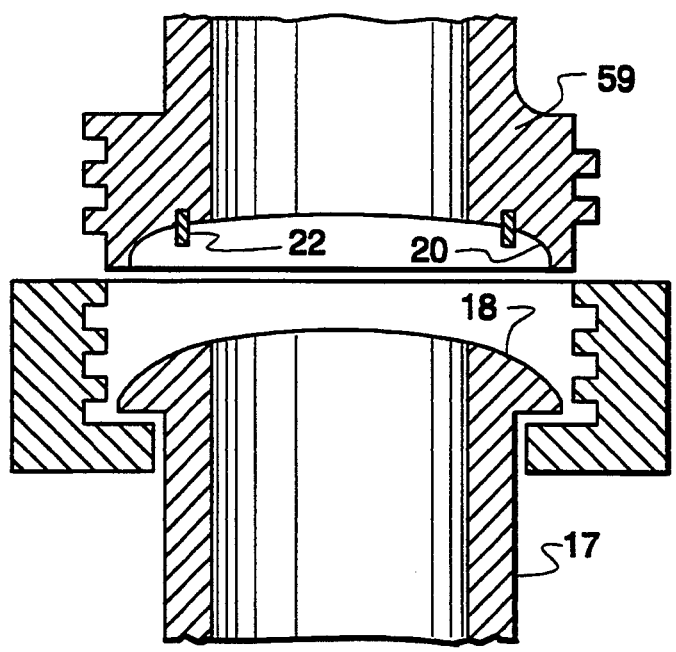
FIG. 6 is a cross-sectional skeleton view of a further embodiment of the coupling seal used in the coupling of the invention.

Another seal arrangement detail is shown in FIG. 6, wherein the sealing surfaces 18 and 20 of housing 17 and housing 59 are shown in a curved shape. These surfaces seen in three dimensions are actually matching segments of a sphere. As matching segments of a sphere, sealing surfaces 18 and 20 provide the same shape relative to each other regardless of alignment, thus a constant sealing force.

Sealing material 22 is installed on the downstream or receiving tank half of the coupling. This will be a warm seal as successive receiving tanks are filled. The warm seal 22 and matching spherical surfaces 18 and 20 assures a positive seal with a minimum tightening force and no sensitivity to coupling alignment.

Figure 4:
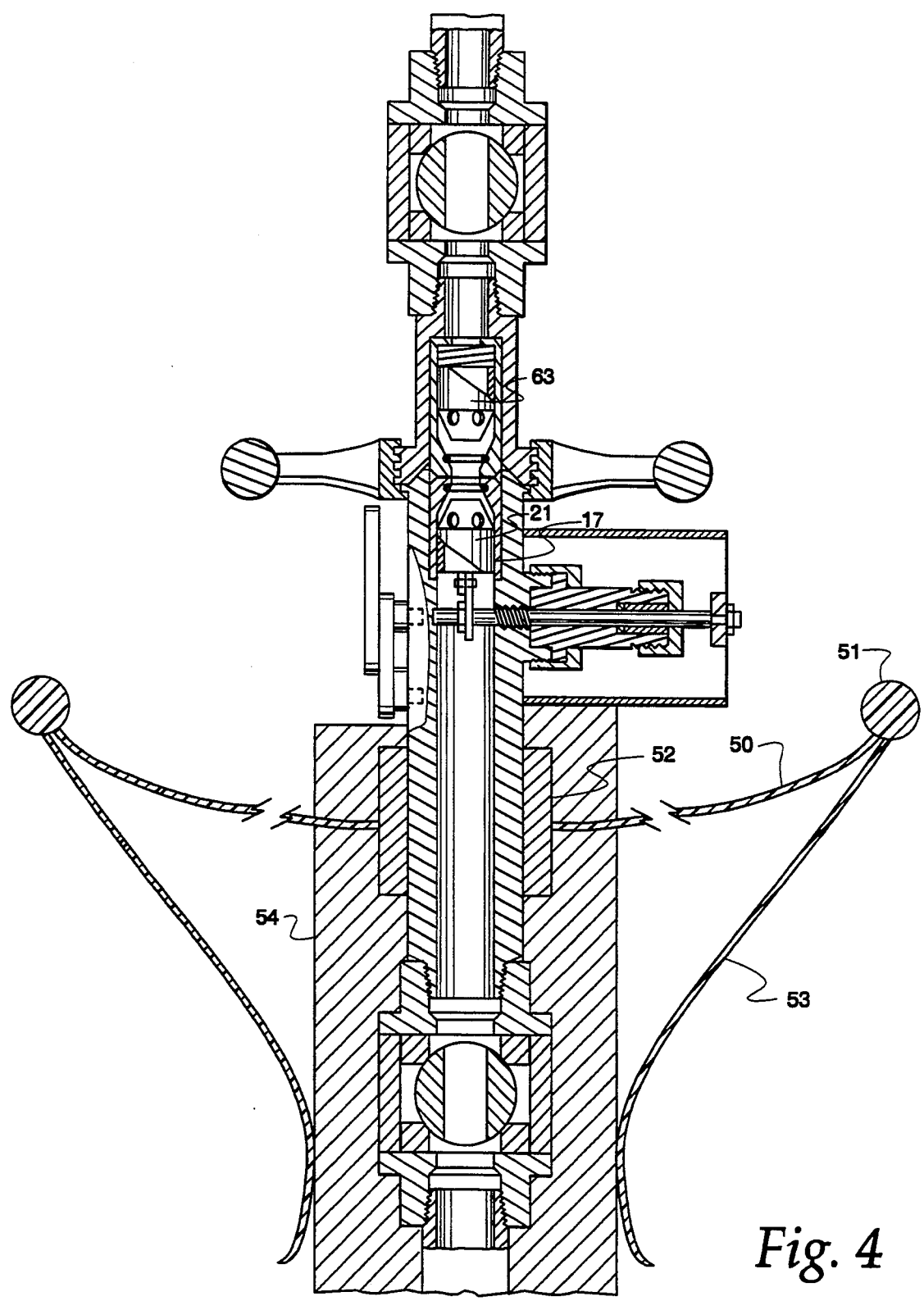
FIG. 4 is a cross-sectional view of the engaged coupling with all valves in an open position.

A coupling support means is also shown on FIG. 4. The coupling support prevents damage to the coupling assembly if the coupling is accidentally dropped. The coupling support consists of a coupling support ring 51 which is held in a radially extended position with respect to housing 17 by a wheel arrangement 50 which is somewhat flexible and is attached to housing 17 by hub 52. The wheel arrangement 50 has insulating properties to prevent the cryogenic cold from reaching the coupling support ring 51. The warm coupling support ring 51 then also acts as a safe means for the operating person to handle the coupling without contact with the cryogenic cold.

The coupling support ring also has a similar somewhat flexible material 53 attached to it and positioned to provide a protection for the operating person's legs.

Also, as shown in FIG. 4, the coupling includes insulation 54 which is flexible in cryogenic service. Suitable insulation is described in U.S. Pat. application Ser. No. 152,855 filed Nov. 15, 1993. This insulation 54 provides further protection to the operating person.

Taken in total, the above described coupling provides a means for transfer of cryogenic fluids in such a way that the cryogenic nature of the fluid being transferred becomes essentially invisible to the operating personnel.

What is claimed is:

1. A coupling assembly for dispensing cryogenic fluids comprising:
   (a) a dispensing conduit having a downstream terminus coupled to a source of a cryogenic fluid and an upstream dispensing terminus;
   (b) a first poppet valve assembly comprising a first cylindrical housing coupled to said upstream dispensing terminus, said first poppet valve assembly having valve seat means affixed to the inside diameter of said first housing, first coupling seat means at the upstream terminus of said housing, a first poppet valve slidably disposed within said first seat means and mechanical actuator means for moving said poppet valve from an upstream closed position to a downstream open position;
   (c) an outwardly extending circumferential flange from said housing at the downstream terminus of said first poppet valve assembly housing for receiving a closure section of said closure section having an upstream circumferential flange which mates with said housing flange to retain said closure section on said housing to prevent lateral movement of said closure section, said closure section having a lateral, internally threaded section extending downstream past said poppet housing;
   (d) a second poppet valve assembly having a downstream terminus coupled to a receiving tank for said cryogenic fluid and an upstream terminus for coupling with said first poppet valve assembly, said second poppet valve assembly having a second cylindrical housing, second poppet valve seat means affixed to the inside diameter of said housings, second coupling seat means at the downstream terminus of said house, a second poppet valve slidably disposed within said second seat means, spring retaining means at the downstream terminus of said second poppet valve seat means, spring means disposed between the downstream terminus of said second poppet valve means and said spring retaining means, said spring means being under compression to retain said second poppet valve in a closed position, said housing having an external threaded section which mates with the internal threaded section of said closure wheel so that the terminal ends of said first poppet valve assembly housing and said second poppet valve assembly housing are drawn into a liquid tight closed relationship when said closure wheel is turned and whereby after said liquid tight closed relationship is established and said first poppet valve is mechanically moved to an open position, the pressure of said cryogenic fluid acting against said spring means to cause said second poppet valve to move from its seat so as to open said second poppet valve.

2. A coupling assembly in accordance with claim 1 wherein said first and second coupling seat means have the shape of a section of a sphere.

3. A coupling assembly in accordance with claim 1 wherein a seal material is disposed in the surface of said second coupling seat.

4. A coupling assembly in accordance with claim 1 wherein a closure wheel is attached to said threaded closure section by means of an insulating material.

5. A coupling assembly in accordance with claim 1 wherein a coupling support extends radially from the conduit connected to said first poppet valve assembly.

6. A coupling assembly in accordance with claim 5 which comprises a coupling support ring affixed to a wheel attached to said conduit.

7. A coupling assembly in accordance with claim 5 having an insulating shield affixed to said coupling support.

8. A coupling assembly in accordance with claim 6 wherein said wheel is an insulating material to keep said coupling support ring warm for use as a handle.

9. A coupling assembly in accordance with claim 1 wherein said dispensing conduit is wrapped with insulation.

10. A coupling assembly in accordance with claim 1 wherein a vapor containment chamber is disposed adjacent said coupling assembly in the assembled position, said vapor containment chamber comprising a cylindrical wall spaced from said coupling assembly and means to establish a flow of a purge vapor in the space between said wall and said coupling assembly.

11. A coupling in accordance with claim 10 wherein the vapor containment chamber has foraminous flexible seals to limit the amount of purge vapor required.

* * * * *